US012141739B2

(12) United States Patent
Mallers

(10) Patent No.: US 12,141,739 B2
(45) Date of Patent: *Nov. 12, 2024

(54) DISTRIBUTED COMPUTING SYSTEM THAT PRACTICALLY APPLIES NETWORKED COMPUTING TECHNOLOGY AND MACHINE-READABLE INDICIA TO SUPPORT TRACEABILITY OF PRODUCTS FROM PROVIDERS TO CLIENTS

(71) Applicant: FARM-LOGIX, LLC, Chicago, IL (US)

(72) Inventor: Linda Mallers, Evanston, IL (US)

(73) Assignee: FARM-LOGIX, LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,471

(22) Filed: Dec. 19, 2023

(65) Prior Publication Data

US 2024/0119402 A1    Apr. 11, 2024

Related U.S. Application Data

(63) Continuation of application No. 17/678,300, filed on Feb. 23, 2022, now Pat. No. 11,861,548, which is a
(Continued)

(51) Int. Cl.
*G06Q 10/0832* (2023.01)
*G06Q 10/0833* (2023.01)
*G06Q 10/0834* (2023.01)

(52) U.S. Cl.
CPC ..... *G06Q 10/0832* (2013.01); *G06Q 10/0833* (2013.01); *G06Q 10/0834* (2013.01)

(58) Field of Classification Search
CPC .......... G06Q 10/0832; G06Q 10/0833; G06Q 10/0834
(Continued)

(56) References Cited

U.S. PATENT DOCUMENTS 7,440,901 B1    10/2008   Dlott et al.
8,201,737 B1     6/2012   Palacios Durazo et al.
(Continued)

FOREIGN PATENT DOCUMENTS

CA    2416386 A1 *  7/2004  ............. G06Q 10/06
WO    2015161159 A1   10/2015

OTHER PUBLICATIONS

R. Z. Cao, X. Y. He, H. Zhang and F. C. Wang, "Establish trust from whole chain traceability," Aug. 30, 2011. Proceedings of 2011 IEEE International Conference on Service Operations, Logistics and Informatics, 2011, pp. 325-330. (Year: 2011).*
(Continued)

*Primary Examiner* — Jeff Zimmerman
*Assistant Examiner* — Hunter A Molnar
(74) *Attorney, Agent, or Firm* — Thompson Coburn LLP; Benjamin L. Volk, Jr.

(57) ABSTRACT

A distributed computing system is disclosed that practically applies networked computing technology and machine-readable indicia to support traceability of products from providers to clients, the system comprising a plurality of distributed computers for communication over a network regarding a product identified by machine-readable indicia, for which a record is maintained in memory, and which is distributed through a supply chain that includes at least the provider, a distributor, and the client. The distributed computers include first, second, third, and fourth computers that cooperate with each other to support compliance with client rules and tracing of the order from the provider to the client through the participants in the supply chain via the machine-readable indicia and associations that are created in the memory to link the product with its passage through the supply chain.

24 Claims, 5 Drawing Sheets

Related U.S. Application Data continuation-in-part of application No. 14/621,566, filed on Feb. 13, 2015, now abandoned.

(60) Provisional application No. 62/011,684, filed on Jun. 13, 2014, provisional application No. 61/940,013, filed on Feb. 14, 2014.

(58) Field of Classification Search
USPC .......................................................... 705/332
See application file for complete search history.

(56) References Cited

U.S. PATENT DOCUMENTS

| | | | |
|---|---|---|---|
| 8,244,603 B1* | 8/2012 | Tang | G06Q 10/0633 705/28 |
| 11,861,548 B2 | 1/2024 | Mallers | |
| 2003/0069774 A1* | 4/2003 | Hoffman | G06Q 30/0201 705/7.29 |
| 2003/0143515 A1 | 7/2003 | Fromm-Ayass et al. | |
| 2004/0004119 A1* | 1/2004 | Baldassari | B07C 3/10 235/383 |
| 2004/0015477 A1* | 1/2004 | Beck | G06Q 10/06 |
| 2009/0248527 A1 | 10/2009 | Strimling et al. | |
| 2011/0315765 A1* | 12/2011 | Schantz | G01S 13/751 235/385 |
| 2012/0234908 A1 | 9/2012 | Wang et al. | |
| 2013/0325893 A1 | 12/2013 | Asay et al. | |
| 2014/0317013 A1* | 10/2014 | Langhorne, III | G06Q 10/0637 705/337 |
| 2016/0171439 A1* | 6/2016 | Ladden | G06F 3/048 705/340 |

OTHER PUBLICATIONS

Cao et al., "Establish trust from whole chain traceability," Proceedings of 2011 IEEE International Conference on Service Operations, Logistics and Informatics, Aug. 30, 2011, pp. 325-330.

Prosecution History for U.S. Appl. No. 14/621,566, filed Feb. 13, 2015.

Prosecution History for U.S. Appl. No. 17/678,300, now U.S. Pat. No. 11,861,548, filed Feb. 23, 2022.

* cited by examiner

DISTRIBUTED COMPUTING SYSTEM THAT PRACTICALLY APPLIES NETWORKED COMPUTING TECHNOLOGY AND MACHINE-READABLE INDICIA TO SUPPORT TRACEABILITY OF PRODUCTS FROM PROVIDERS TO CLIENTS

CROSS-REFERENCE AND PRIORITY CLAIM TO RELATED APPLICATIONS

This application is a continuation of U.S. patent application Ser. No. 17/678,300, filed Feb. 23, 2022, and entitled "DISTRIBUTED COMPUTING SYSTEM THAT PRACTICALLY APPLIES NETWORKED COMPUTING TECHNOLOGY AND MACHINE-READABLE INDICIA TO SUPPORT TRACEABILITY OF PRODUCTS FROM PROVIDERS TO CLIENTS", now U.S. Pat. No. 11,861,548, the entire disclosure of which is incorporated herein by reference, which is a continuation-in-part of U.S. patent application Ser. No. 14/621,566, filed Feb. 13, 2015, and entitled "AGRICULTURE DISTRIBUTION AND MANAGEMENT SYSTEM", the entire disclosure of which is incorporated herein by reference, and where the '566 patent application claims priority to (1) U.S. Provisional Patent Application No. 61/940,013 filed Feb. 14, 2014, and entitled "AGRICULTURE DISTRIBUTION AND MANAGEMENT SYSTEM" and (2) U.S. Provisional Patent Application No. 62/011,684 filed Jun. 13, 2014, and entitled "AGRICULTURE PRODUCT TRACKING SYSTEM AND METHODS OF PERFORMING THE SAME".

BACKGROUND OF THE INVENTION

As environmental and sustainability issues grow in importance around food, and corporations commit to making their sustainable purchases a percentage of their total buying commitment, more organizations are moving to buying consumable products from local suppliers to put valuable dollars back into the local economies that support their business, and minimize carbon emissions. Conventional distribution systems are not structured to fill orders that are farm and producer specific, even though customers increasingly demand full traceability, farm/source-identified product, and adherence to specific breeding practices. For example, conventional computer systems in a supply chain for distribution of agricultural products involve siloed computers used by participants where each participant's computer maintains its own records with little or no coordination of their records among other participants in the supply chain. This means that each participant in the supply chain is focused only on its limited purview and has limited knowledge of the overall supply chain. Moreover, there are technical problems that inhibit the integration of these siloed records as there is little to no inter-compatibility between the records that would allow for reliable supply chain tracing. Further, many farmers, producers and processors do not have access to distributors and customers looking to purchase locally grown, sustainable and responsibly grown/raised products. Lastly, schools, universities and hospitals all require strict adherence to USDA guidelines on issues around food safety, such as delivery of product in a refrigerated truck, that are not possible for a small farmer. They also have difficulty finding and vetting out farms that raise meats responsibly (antibiotic-free, gestation and crate free, free range, etc.) on their own.

Current distributions system consolidate items together independent of the source of the item preventing the tracking of items by source.

A need exists for system that will allow clients to order locally grown products, responsibly raised meats, and organics that can be source-identified, and have them shipped to the clients location by their contracted distributor. Further still, there are technical needs in the art for computer systems that provide reliable supply chain tracing of agricultural products from providers to clients.

SUMMARY OF THE INVENTION

As a technical solution to these technical shortcomings in the art, the inventor discloses a distributed computing system that practically applies networked computing technology and machine-readable indicia to support traceability of products from providers to clients.

As a first example embodiment, this system comprises a plurality of distributed computers for communication over a network, the distributed computers including first, second, third, and fourth computers. The first computer comprises a memory, and the first computer is configured to store data in the memory, wherein the stored data comprises order data about an order for a product, the client having an associated local sourcing rule.

The second computer is for operational use by a provider of the product with respect to the order. The third computer is for operational use by a distributor for the product with respect to the order. The fourth computer is for operational use by a client for the order. The second, third, and fourth computers are configured to generate additional data about the product for association in the memory with the order data via communications over the network, wherein the additional information comprises (1) a product identifier obtained from a machine-readable indicia for use with the product or a container for the product, wherein the product identifier encodes (i) provider information for the provider and (ii) product information for the product, (2) geographic information about the provider, and (3) dates of delivery and receipt for the product as the product moves through a supply chain from the provider to the client via the distributor, wherein the dates of delivery and receipt are linked to the product identifier.

The local sourcing rule requires that the product be sourced from a provider within a defined geographic region; and the first, second, third, and fourth computers cooperate with each other to (1) support tracing of the order from the provider to the client through the distributor based on the machine-readable indicia and the associations in the memory and (2) evaluate compliance for the order with the local sourcing rule based on the defined geographic region as compared to the geographic information about the provider of the product that is associated with the order data in the memory. As such, this first example embodiment practically applies computer technology and machine-readable indicia to yield a distributed computing system that combines a centralized data record in the memory with a distributed update process for the centralized data record whereby the different distributed computers augment the centralized data record with their respective information about handling of the product by the participants within the supply chain (e.g., a provider, distributor, and client). Through such a hybridized combination of centralized records and the use of distributed computers to generate updates to those records, the first example embodiment serves as an unconventional and significant innovative technical advance in the art that improves upon conventional computer systems in the art as discussed above. Moreover, by using machine-readable indicia to reliably identify the product in combination with identifiers that can be shared by other participants in the supply chain, this centralized record can accurately and quickly reflect the current state and history of a given product in the supply chain. This helps reduces network congestion and improves the efficiency of the distributed computing system. For example, because the centralized record can be updated on the fly as each participant augments the relevant record with its contribution to the status of the subject product, a user who wants to ascertain the supply chain history of a given product merely needs to access and read the centralized record. There is no need for the system to attempt to construct the supply chain history in response to the user request by issuing record requests about the subject product over a computer network to the respective computer systems of participants in the supply chain, waiting for responses to those record requests, and then interpreting and assembling such responses into a current view of the supply chain. Moreover, due to the efficiency and reliability of this innovative approach to computer network-based distributed updates of centralized records, the ability to enforce client rules regarding aspects of the supply chain can be implemented in an efficient manner that avoids unnecessary network congestion.

As another example embodiment, the inventor discloses a product management unit that includes a processor, a memory, an identifier generating unit and an identifier reading unit with the memory operating a program executing the steps of retrieving a plurality of rules relating to the production and delivery of a product from a producer to a client, selecting at least one provider based on the plurality of rules to provide the product in compliance with the client rules, selecting a facility to aggregate the product from the at least one provider based on the client rules, selecting a distributor to deliver the product to the client from a distribution facility to the client based the client rules, selecting a backhaul provider to deliver the product from the aggregation facility to the distribution facility based on the client rules, generating a unique identifier for the product and affixing the unique identifier to the product or a container holding the product, associating the unique identifier with the provider, facility, distributor and back haul provider, and monitoring the movement of the product to confirm compliance.

In another example embodiment, a unique identifier is assigned to the product by the product management unit.

In another example embodiment, a unique identifier is assigned to the provider by the product management unit.

In another example embodiment, a product code is generated based on the product identifier and the provider identifier.

In another example embodiment, the product management unit also performs the step of selecting a location in a distribution center of a distributor for quarantining the product before delivery to the customer.

In another example embodiment, the product management unit applies at least one distributor rule in selecting a distributor to deliver the product to the client.

In another example embodiment, the product management unit applies at least one back haul provider rule in selecting a back haul provider to deliver the product to the client.

In another example embodiment, the product is produce.

In another example embodiment, the client rule includes information on the geographical region from which the products must originate.

Another example embodiment includes a product management system including a product management unit that includes a processor, a memory, an identifier generating unit and an identifier reading unit with the memory operating a program executing the steps of assigning a product a product identifier; generating the product identifier and affixing the product identifier to the product, associating a provider identifier with the product identifier; generating a transfer identifier for a device transporting the product and affixing the identifier to the transfer device; associating the transport identifier to the product identifier, generating an aggregation identifier for an aggregation facility where the product is stored, associating the aggregation identifier with the product identifier; generating a distribution identifier for a distribution facility storing the product, and associating the distribution identifier with the product identifier, where the product management unit tracks the location of the product by reading the product identifier and at least one other identifier during the delivery of the product.

In another example embodiment, the aggregation facility is determined based on the provider identifier and product identifier.

In another example embodiment, the transport device is determined based on the product identifier read and the determined aggregation facility.

In another example embodiment, the product management unit determines a location for storage in the aggregation facility based on the product identifier read.

In another example embodiment, the product management unit performs the step of reading an aggregate facility location identifier identifying the location in the aggregation facility where the product is sold.

In another example embodiment, the product management unit confirms the aggregate facility location identifier is the same as the aggregation facility location assigned by the product management unit.

In another example embodiment, each identifier is a bar code.

In another example embodiment, each identifier is one of a bar code, RFID tag or smart tag.

In another example embodiment, each identifier is of a different format.

In another example embodiment, the product is produce.

In another example embodiment, the product is poultry.

These and other features and advantages of the invention are described hereinafter with reference to the drawings as would be understood by those skilled in the art.

BRIEF DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DETAILED DESCRIPTION OF EXAMPLE EMBODIMENTS

While various embodiments of the present invention are described herein, it will be apparent to those of skill in the art that many more embodiments and implementations are possible that are within the scope of this invention. Accordingly, the present invention is not to be restricted except in light of the attached claims and their equivalents.

Described herein is a system for managing the distribution of agricultural products based on a plurality of rules which will allow for the tracking of an item through an entire distribution channel based on the source of the item. The system receives orders for products from clients along with specific rules related to the products, analyzes the distribution rules that apply for each product, generates a list of providers, distributors and aggregation facilities based on the rules associated with each client or product and monitors the delivery of the products to the end location. By tracking items based on source and rules defined by a customer, the process of delivering source specific items is improved, as the source of the product can be confirmed upon delivery to the client.

Systems currently in use do not allow for the tracking of a product, such as produce, based on the source of the product. Instead, distributors aggregate products together and deliver the products to customers independent of the source of the product. With the rise in importance of locally sourced products, the need to determine what products are locally sourced has become critical. By identifying and tracking a product from the source of the product through the deliver, clients can confirm the products they are purchasing are locally sourced.

Figure 1:
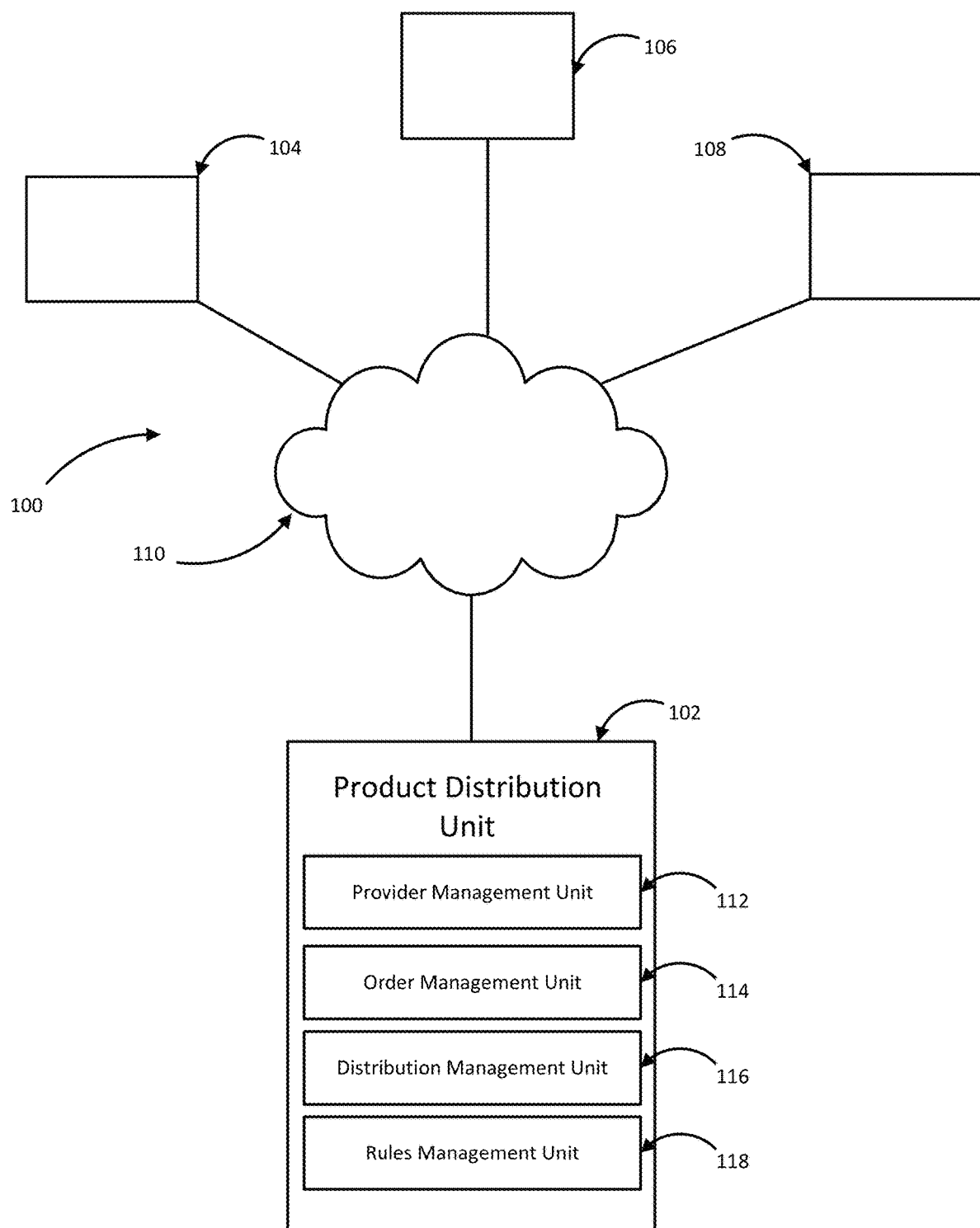
FIG. 1 depicts a block diagram of an Agricultural Product Management System suitable for use with the methods and systems consistent with the instant disclosure.

FIG. 1 depicts a block diagram of an Agricultural Product Management System ("APM") 100 suitable for use with the systems consistent with the present disclosure. The APM 100 comprises a plurality of computers 102, 104, 106 and 108 connected via a network 110. The network 110 is of a type that is suitable for connecting the computers for communication, such as a circuit-switched network or a packet switched network. Also, the network 110 may include a number of different networks, such as a local area network, a wide area network such as the Internet, telephone networks including telephone networks with dedicated communication links, connection-less network, and wireless networks. In the illustrative example shown in FIG. 1, the network 110 is the Internet. Each of the computers 102, 104, 106 and 108 shown in FIG. 1 is connected to the network 110 via a suitable communication link, such as a dedicated communication line or a wireless communication link.

In an illustrative example, computer 102 serves as a Product Distribution Unit ("PDU") that includes a provider management unit 112, an order management unit 114, a distributor management unit 116 and a rules management unit 118. The number of computers and the network configuration shown in FIG. 1 are merely an illustrative example. One having skill in the art will appreciate that the APS 100 may include a different number of computers and networks. For example, computer 102 may include the provider management unit 112 as well as one or more of the order management unit 114 and rules management unit 118.

Further, the distributor management unit 116 may reside on a different computer than computer 102.

Figure 2:
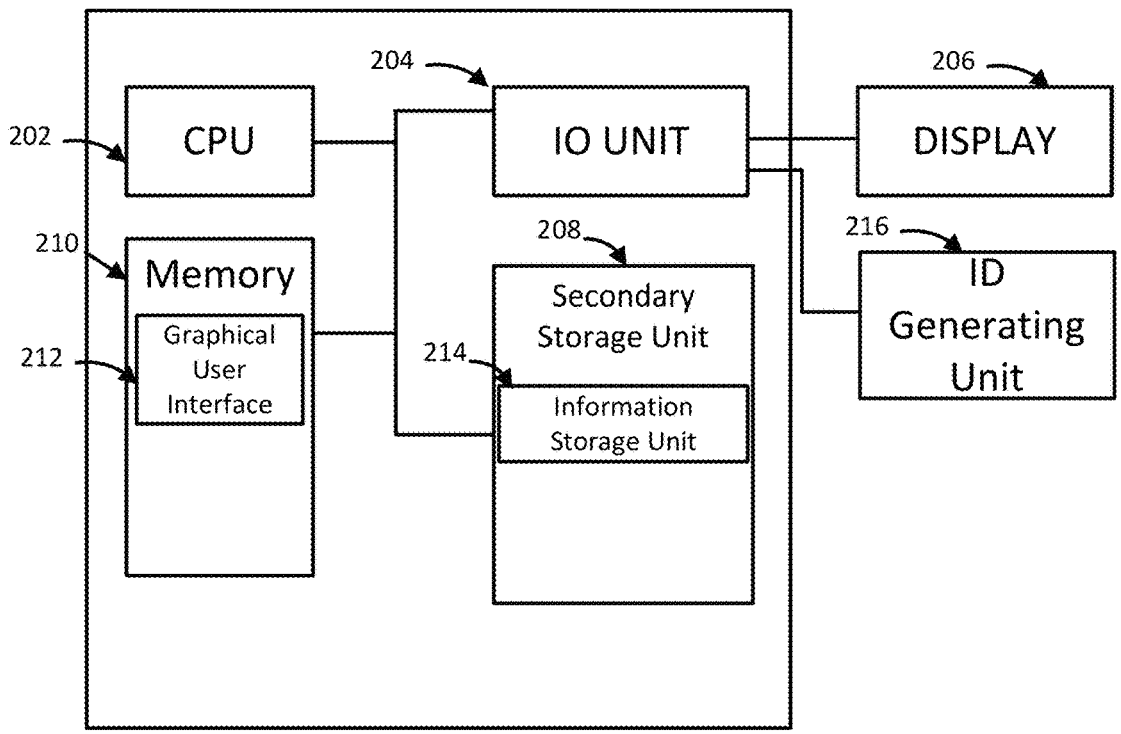
FIG. 2 shows a more detailed depiction of a computer of FIG. 1.

FIG. 2 shows a more detailed depiction of the computer 102. The computer 102 comprises a central processing unit (CPU) 202, an input output (IO) unit 204, a display device 206 communicatively coupled to the IO Unit 204, a secondary storage device 208, and a memory 210. The computer 202 may further comprise standard input devices such as a keyboard, a mouse, a digitizer, or a speech processing means (each not illustrated).

The computer 102's memory 210 includes a Graphical User Interface ("GUI") 212 that is used to gather information from a user via the display device 206 and I/O unit 204 as described herein. The GUI 212 includes any user interface capable of being displayed on a display device 206 including, but not limited to, a web page, a display panel in an executable program, or any other interface capable of being displayed on a computer screen. The GUI 212 may also be stored in the secondary storage unit 208. In one embodiment consistent with the present invention, the GUI 212 is displayed using commercially available hypertext markup language ("HTML") viewing software such as, but not limited to, Microsoft Internet Explorer, Google Chrome or any other commercially available HTML viewing software. The secondary storage unit 208 may include an information storage unit 214. The information storage unit may be a relational database such as, but not including Microsoft's SQL, Oracle or any other database. An identifier generating unit 216 may be communicatively coupled to the IO unit 204. The identifier generating unit 216 may be a device capable of generating an identifier such as a bar code printer, a smart tag printer and encoder or any other type of identifier generator.

Figure 3:
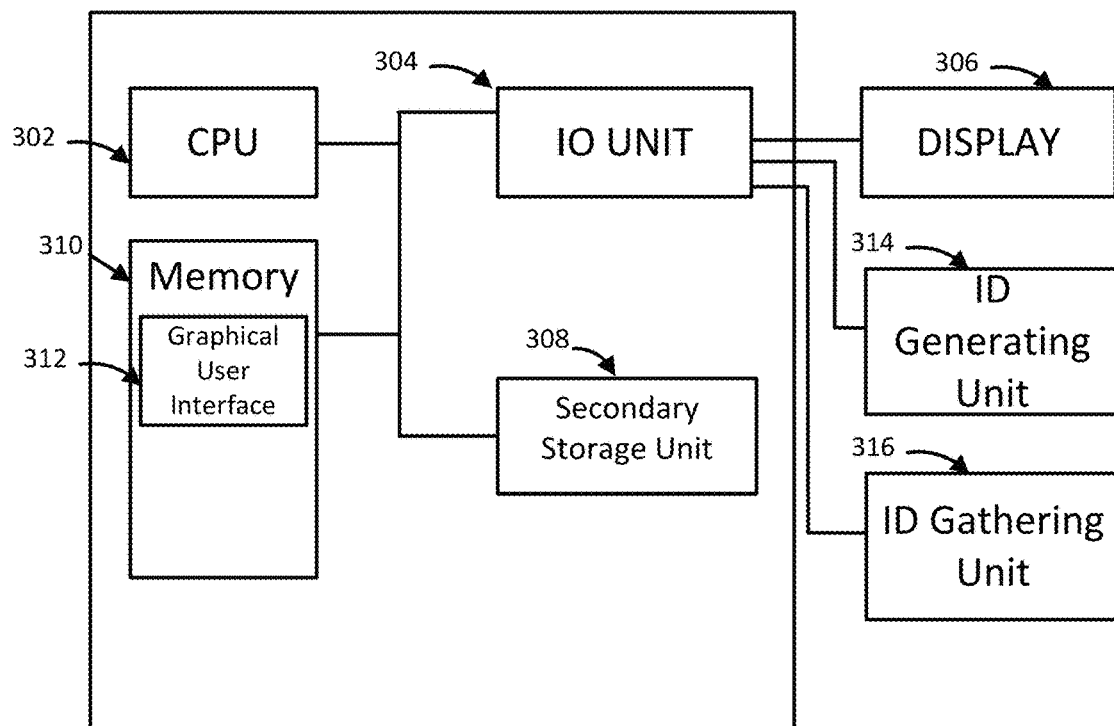
FIG. 3 shows a more detailed depiction of additional computers of FIG. 1.

FIG. 3 shows a more detailed depiction of the computers 104, 106 and 108. Each computer 104, 106 and 108 comprises a central processing unit (CPU) 302, an input output (IO) unit 304, a display device 306 communicatively coupled to the IO Unit 304, a secondary storage device 308, and a memory 310. Each computer 104, 106 and 108 may further comprise standard input devices such as a keyboard, a mouse, a digitizer, or a speech processing means (each not illustrated).

Each computer 104, 106 and 108's memory 310 includes a GUI 312 which is used to gather information from a user via the display device 306 and IO unit 304 as described herein. The GUI 312 includes any user interface capable of being displayed on a display device 306 including, but not limited to, a web page, a display panel in an executable program, or any other interface capable of being displayed on a computer screen. The GUI 312 may also be stored in the secondary storage unit 208. In one embodiment consistent with the present invention, the GUI 312 is displayed using commercially available HTML viewing software such as, but not limited to, Microsoft Internet Explorer, Google Chrome or any other commercially available HTML viewing software. An identifier generating unit 314 may be communicatively coupled to the IO unit 304. The identifier generating unit 314 may be a device capable of generating an identifier such as a bar code printer, a smart tag printer and encoder or any other type of identifier generator. An identifier gathering unit 316 may also be communicatively coupled to the IO unit 304. The identifier gathering unit 316 may be a bar code reader, a smart card reader, an RFID reader, a camera or any other identifier gathering device.

Figure 4:
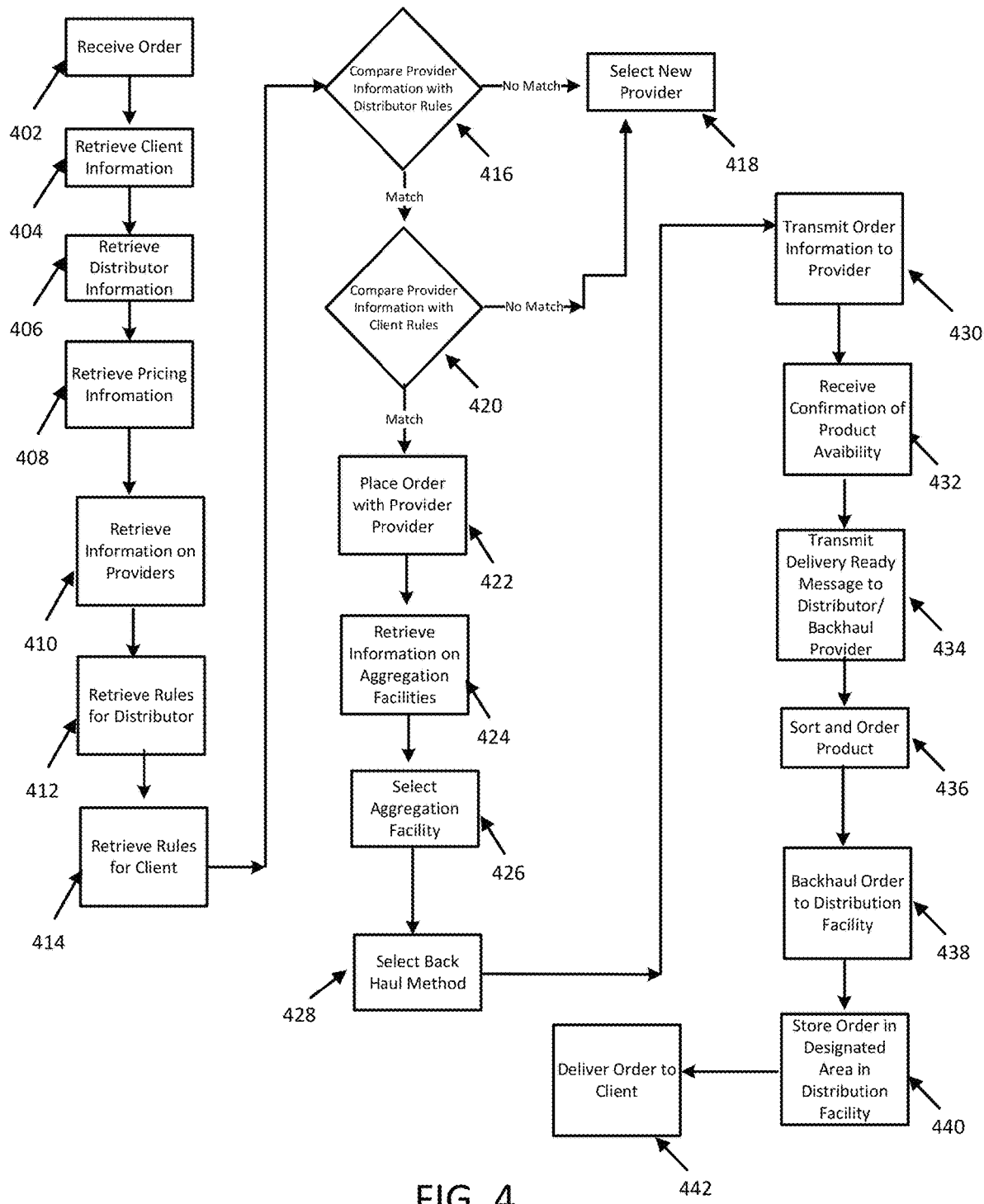
FIG. 4 depicts an illustrative example of the operation of the Agricultural Product Management System of FIG. 1.

FIG. 4 depicts an illustrative example of the operation of the AMS 100. In step 402, the order management unit 114 receives an order for an agricultural product such as, but not limited to, produce including fruits and vegetables, meat, poultry, dairy products including milk, cheese, yogurt or any other agricultural product. The order may be received via a web page, e-mail, text message or by any other means of ordering a product. The order may indicate the quantity of one or more products that must be delivered to the client or distributor. In one embodiment, the order management unit 114 posts a listing of available products and associated products and a client enters in the amount of each product for the order. In step 404, the order management unit 114 retrieves the client information from the order. The order management unit 114 may also retrieve some of the client information from the information storage unit 214, from the order message or from the client when the order is placed. The client information may include, the client name, address, phone number, location the order was placed, location or locations where the order must be delivered, the distributor or distributors associated with the client, or any other information pertaining to the client. In one embodiment, the distributor is identified in the order. In another embodiment, a listing of distributors in the information storage unit 214 is associated with the client and can be applied to fill the order based on the client rules. The client may include, but is not limited to, health care facilities such as hospitals, institutions such as schools, universities, government agencies, nursing homes, extended care facilities, or any other facility provided products to a consumer.

In step 406, the distribution management unit 116 retrieves information from the information storage unit 214 for each distributor associated with the client or the distributor named in the order. The distributor information may include, but is not limited to, the name and address of the distributor, the region the distributor operates, and any other information associated with the distributor. In step 408, the order management unit 114 retrieves pricing from producers to fill each order from the client or distributor. In one embodiment, the pricing of the product is retrieved from the information storage unit 214. Consistent with this embodiment, each producer may enter in the available products and associated pricing into the information storage unit 214, and the distribution management unit 116 may retrieve the pricing information for the products included in each order. In one embodiment, the order management unit 114 transmits a message, such as an e-mail message, requesting a provider to provide a quotation for the products identified in the order. In another embodiment, the order management unit 114 only allows preapproved providers to provide pricing and available products to a specific client, or distributor. Each request for quote may include a listing of requirements based on the rules associated with the product, client or distributor.

In step 410, the provider management unit 112 retrieves information from the information storage unit 214 on each of the providers responding the to the request for quotation or posting available products from the order management unit 114. The provider information may include, but is not limited to, the provider address, equipment information related to the production, delivery or storage of the product or geographical information of the provider. In step 412, the order management unit 114 retrieves the rules from the information storage unit 214 associated with each distributor. The rules define requirements for fulfillment of the order such as condition of the product, the delivery method of the product, the quantity of product delivered in a single shipment, the geographic location where the producer must reside, the number of producers that can provide products for the order or any other restriction placed on the delivery or receipt of the product by the distributor. The order management unit 114 may apply different distributor or client rules depending on the type of product ordered. The client and distributor rules may also include requirements for food quality, storage and deliver that are required under federal or state law or under any federal or state food safety regulations.

In step 414, the order management unit 114 retrieves rules from the information storage unit 214 pertaining to the client. The rules define restrictions on the provider filling the order and the method of delivery from the distributor to the client or from the producer to the distributor. The client rules may also define an area or region where the producer must reside or the residency, ethnicity, economic background or any other demographic defining the producer of the product. As an illustrative example, an order may relate to the sourcing of organic products, and sustainable and responsibly-raised meats, including, but not limited to meats raised without antibiotics, free-range animals, and animals raised gestation and breeding crate-free. The order management system 114 would apply rules specific to the gathering and distribution of organic products such as the identification of specific agricultural practices that are required before a product can be labeled "organic." The rules may be entered into the system by the client, distributor or by a third party. In one embodiment, the order management system 114 allows a client to specify the standard or regulation governing the product and the order management system 114 will associate and apply predetermined producer and distributor rules for the order.

In step 416, the order management unit 114 compares the distributor rules to the client information to determine if the provider is eligible to provide the product. In comparing the distributor rules to the customer rules, the order management unit 114 may determine if the equipment, route, product to be delivered or other characteristics of the distributor satisfy the rules associated with the product by the client. In step 418, if the information does not match at least one of the distributor rules, the order management unit 114 declines the quotation from the distributor and selects a new distributor from the list of distributors providing quotations. In step 420, if the distributor rule matches the client rules, the order management unit 114 compares the provider information to the client rules. If the information does not match the client information, the order management unit 114 declines the quotation from the provider and selects the next provider.

In step 422, if the provider information matches the client information and the distributor information, the order management unit 114 accepts the order from the provider. The order may be accepted by transmitting an order acceptance message to the provider. The order acceptance message may include instructions on the date and method of delivery of the product to the distributor. In step 424, the distribution management unit 116 retrieves information from the information storage unit 214 on aggregation locations associated with the distributor. The aggregation facilities are locations where producers deliver and store their deliveries before being picked up by the distributors. The aggregation facilities may house multiple orders for multiple clients and distributors at one time. The information on the aggregation facility may include information on the type of products stored at the facility, the amount of space and type of space available at the aggregation facility or any other information associated with the aggregation facility.

In step 426, the distribution management unit 116 selects an aggregation facility associated with the distributor that meets the client rules. In step 428, the distribution management unit 116 selects a method of delivery from the aggregation facility to the distribution facility or backhaul method. The backhaul method may be based on the client rules and distributor rules. In selecting the backhaul method, the distribution management unit 116 selects a backhaul provider that complies with the distribution and client rules. The backhaul provider may be the product provider, the distributor or another third party who delivers the product from the aggregation facility to the distribution facility.

In step 430, the order management unit 114 transmits delivery information to the provider. The delivery information may include the location and time of the delivery to the aggregation facility, the method of delivery to the aggregation facility or any other information concerning the delivery of the product to the aggregation facility. In step 432, the distribution management unit 116 receives confirmation of the delivery to the aggregation facility. The confirmation may include the date, time, location and a description of the condition of the product when delivered to the aggregation facility. In step 434, the order management unit 114 transmits a delivery ready message, such as an e-mail or text message, to the distributor and backhaul provider notifying the distributor and backhaul provider of the availability of the product at the aggregation facility. The delivery ready confirmation may include information on the delivery of the products from the aggregation facility including the delivery method, time and date of pick-up of the product, the location in the distribution facility where the products are to be stored, and any other information concerning the pick-up of the product by the distributor.

In step 436, the order management unit 114 determines a sort and order process for the product before it is shipped by the backhaul provider. The sort and order process may include steps to perform in order to sort a product into different groups and the order which the products will be loaded and shipped by the backhaul provider. In step 438, the order management unit 114 retrieves information from the information storage unit 214 concerning the pick-up of the product by the backhaul provider. The pick-up information may include the date and time of the pick-up of the product, the condition of the product at pick or any other information related to the pick-up of the product. In step 440, the distribution management unit 116 confirms the location of the product in the distribution facility via the backhaul provider or distributor. The distribution management unit 116 may record the time and date of the delivery of the product to the distribution facility and location in the distribution facility where the product is stored. The distribution management unit 116 may also confirm the product is properly configured and stored in the distribution facility. As an illustrative example, if the order calls for individual bags of 30 carrots, the distribution management unit 116 may gather information from the distribution facility from the information storage unit 214 confirming the configuration of the order is correct. Further, the distribution management unit 116 may notify the distributor of each group of products that must be quarantined from other products before delivery to the client.

In step 442, the distribution management unit 116 notifies the distributor to deliver the product to the client location or locations. The distribution management unit 116 may notify the client of the pending delivery. The client notification may include the proposed date and time of the delivery, the products to be delivered. The distribution management unit 116 may transmit a confirmation of delivery notification after the product has been successfully delivered to the client. After the product is delivered to the client, the distribution management unit 116 may indicate that the area previously occupied in the distribution facility by the delivered product is available to receive new products. The distribution management unit 116 may notify the distributor if all available space allocated for the products in the warehouse become unavailable. The distribution management unit 116 may also reroute the backhaul provider to another distribution facility should all space in one distribution facility become full.

In one embodiment, the provider management unit 112 may record each quotation from a producer that is declined for lack of compliance with a rule. The provider management unit 112 may notify the provider of adjustments to procedures or additional of new equipment that would result in a high acceptance rate of the quotations. In another embodiment, the provider management unit 112 may track the product condition and delivery times of the provider and alert the provider of late deliveries or low product quality. The product condition may be determined by monitoring various sensors included with the deliver or by physical inspection of the product at various points during the delivery. The provider management unit 112 may also rate each provider based on the delivery timeliness, the condition of the product at delivery, the level of compliance with client and distributor rules for each delivery or any other characteristic related to the delivery of the product by the producer. The provider management unit 112 may associate each producer with a specific geographic region, state, county, city or other geographic information. The provider management unit 112 may associate producers with specific distributors and clients based on the producers compliance with the rules of each distributor or client. In another embodiment, the provider management unit 112 may associate specific products produced by a producer with a distributor or client based on the level of compliance of the individual product with the distributor or client rules. The distribution management unit 116 may generate a series of reports demonstrating a client's compliance with a federal or state food program such as a farm to school lunch program.

In one embodiment, an order may be delivered to multiple aggregation facilities and distribution facilities. In another embodiment, multiple distributors and backhaul providers may be utilized to fill an order. Consistent with this embodiment, the distribution management unit 116 will analyze the order in view of the load capacity of each distributor to determine if the product needs to be delivered using multiple back haulers or distributors.

Figure 5:
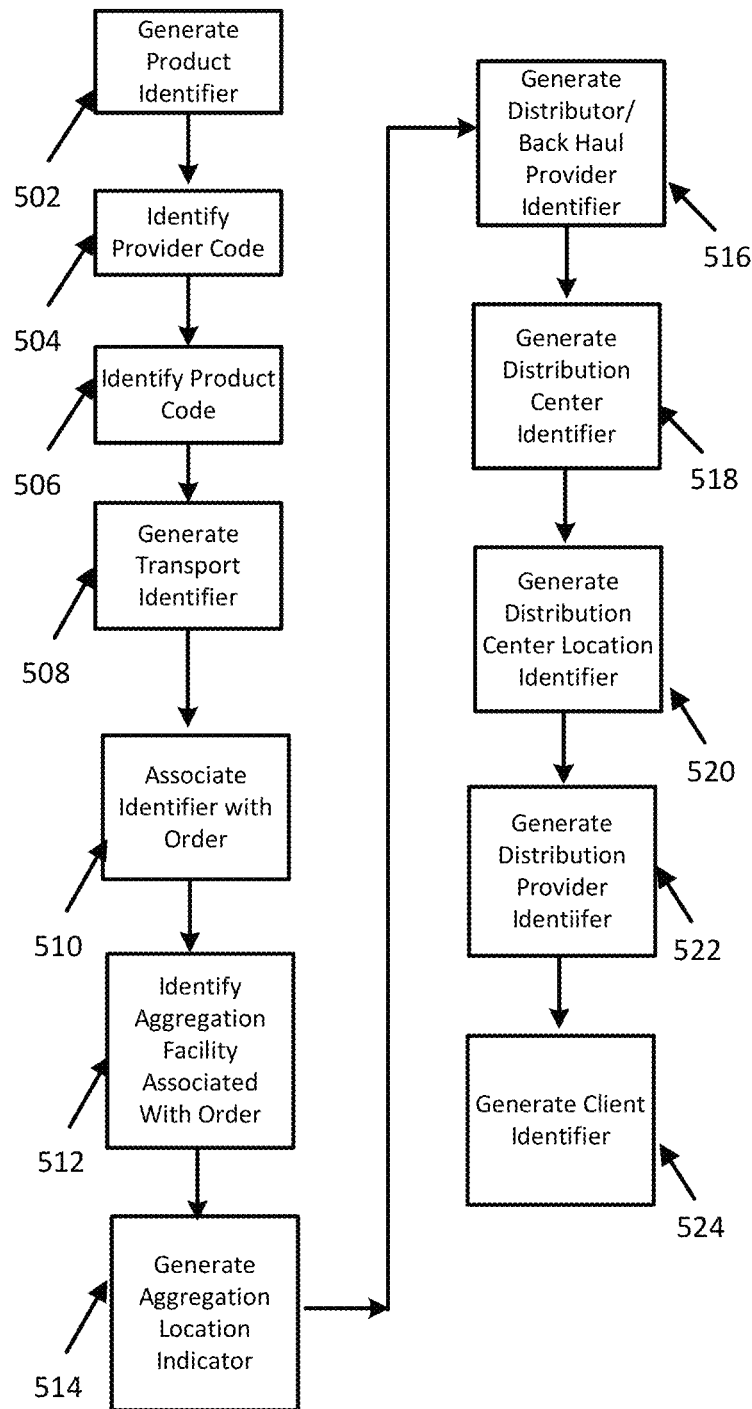
FIG. 5 depicts an illustrative example of the operation of the Agricultural Product Management System of FIG. 1.

FIG. 5 depicts an illustrative example of the operation of the APM 100. In step 502, a product identifier related to a product is generated by the product management unit 114. The product identifier may be any known identifier including, but not limited to, a bar code, a quick response code, a radio frequency identifier ("RFID") tag or any other type of identifier. The identifier may include information on the provider of the product, the type of product and other information on the product. As an illustrative example, the product identifier may be a bar code that includes a provider code identifying the provider of the product and a product code identifying the product associated with the identifier. The product identifier may be added into the system using any known method including, typing the identifier into the system using a keypad, capturing an image of the identifier or using a identifier reader to read the identifier into the system. The identifier may be generated by the identifier generating unit 216 or 314. After the identifier is generated, the identifier may be adhered to the product or a container holding the product to identify the product and its source.

In step 504, the order management unit 114 identifies the provider code in the product identifier and associates the product identifier with the provider code in the information storage unit 214. The provider code may include a location code that indicates the location of the provider. In one embodiment, the provider code is associated with location information of the provider such as name and address of the provider. In another embodiment, the region of the country where the provider resides may also be associated with the provider in the information storage unit 214. In step 506, the order management unit 114 identifies the product code in the product identifier and associates the product identifier with a product type in the information storage unit 214.

In step 508, the distribution management unit 116 generates a transport identifier for the entity transporting the product from the supplier to the aggregation facility and associates the transport identifier with the product identifier in the information storage unit 214. The transport identifier is a unique code or codes, such as a bar code, QR code or RFID tag that identifies the entity transporting the product. The transport identifier may include information such as the identity of the company transporting the product, the driver transporting the product, the type of equipment used to transport the product, and any other information related to the delivery of the product to the aggregation facility. The identifier may be generated by the identifier generating unit 216 or 314. After the identifier is generated, the identifier may be adhered to the equipment transporting the product to identify the entity transporting the product. If the equipment transporting the product has previously been allocated an identifier, the identifier reading unit 316 may read the identifier for use as the transport identifier.

In step 510, the order management unit 14 associates the product identifier and transportation identifier with a specific order in the system. The product identifier and transportation identifier may be related to more than one order, and the transportation identifier may be related to more than one product and order.

In step 512, upon arrival at the aggregation facility, the distribution management unit 116 generates an aggregation facility identifier from the aggregation facility. The aggregation facility identifier may be gathered using any known technique including, but not limited to, scanning an aggregation facility identifier into system using a bar code scanner or RFID reader. The aggregation facility identifier identifies the aggregation facility receiving the product. The aggregation facility identifier is associated with the order, product identifier and transportation identifier in the information storage unit 214. In step 514, after the product is stored in the aggregation facility, an aggregation location identifier is entered into the system. The aggregation location identifier identifies the location in the aggregation facility where the product is stored. Each order, or product in the order, may be associated with more than one aggregation location identifier. In one embodiment, the aggregation facility identifier and the aggregation location identifier are the same identifier. The identifier may be generated by the identifier generating unit 216 or 314. After the identifier is generated, the identifier may be adhered to the aggregation facility or to a structure associated with the aggregation facility to identify the aggregation facility where the product is stored. If the aggregation facility has previously been allocated an identifier, the identifier reading unit 316 may read the identifier for use as the aggregation facility identifier.

In step 516, the distribution management unit 116 generates a back haul provider identifier identifying the back haul provider delivering the product to a distribution facility. Distribution management unit 116 receives the back haul identifier into the system and associates the product identifier, aggregation facility identifier and aggregation location identifier with the order. After the identifier is generated, the identifier may be adhered to the equipment transporting the product to identify the entity transporting the product. If the equipment transporting the product has previously been allocated an identifier, the identifier reading unit 316 may read the identifier for use as the back haul provider identifier.

In step 518, the distribution management unit 116 gathers a distribution facility identifier from the distribution facility using any of the methods of gathering an identifier previously described. The distribution identifier identifies the distribution facility where the product is stored before being delivered to the client. The identifier may be generated by the identifier generating unit 216 or 314. After the identifier is generated, the identifier may be adhered to the distribution facility or a structure related to the distribution facility to identify the distribution facility storing the product. If the distribution facility has previously been allocated an identifier, the identifier reading unit 316 may read the identifier for use as the distribution facility identifier.

In step 520, the distribution management unit 116 generates a distribution location identifier indicating the location in the distribution facility where the product is stored. In one embodiment, the distribution identifier an distribution location identifier may be the same identifier. The identifier may be generated by the identifier generating unit 216 or 314. After the identifier is generated, the identifier may be adhered to the distribution facility location or a structure associated with the distribution facility location to identify the location in the distribution facility where the product is stored. If the distribution facility location has previously been allocated an identifier, the identifier reading unit 316 may read the identifier for use as the distribution facility location identifier.

In step 522, the distribution management unit 116 generates a distribution provider identifier indicating a distributor that delivers the product from the distribution location to the client. The distribution management unit 116 associates the distributor identifier with the order in the information storage unit 214. The identifier may be generated by the identifier generating unit 216 or 314. After the identifier is generated, the identifier may be adhered to the distribution provider to identify the distributor delivering the product. If the distribution facility location has previously been allocated an identifier, the identifier reading unit 316 may read the identifier for use as the distribution provider identifier.

In step 524, the distribution management unit 116 generates a client identifier gathered by the distribution provider that confirms the product is delivered to the client. Upon delivery of the product to the client, the client identifier is gathered and the order is marked as delivered. The identifier may be generated by the identifier generating unit 216 or 314. After the identifier is generated, the identifier may be adhered to the customer location or a structure associated with the customer to identify the customer receiving the product. If the customer has previously been allocated an identifier, the identifier reading unit 316 may read the identifier for use as the customer identifier.

In one embodiment, the information gathered by the provider tracking unit 112 gathers date and time information for each identifier entered into the system. The date and time information indicates the approximate date and time a specific identifier is entered into the system. By gathering different location, product and provider identifiers, and date/time information the product tracking and location unit can track the history of the sourcing and delivery of the product. In one embodiment, the information gathered by the provider tracking unit 112 may be associated with environmental information to confirm the environmental conditions encountered by the product throughout the delivery process.

In the event the product has been stored in a manner that is inconsistent with the client rules, the product may be quarantined and not deliver to the customer. To quarantine the product, the provider management unit 112 may notify the distributor or aggregation facility via an electronic message, such as an e-mail, to move the product to a predefined quarantine location in the distribution facility or aggregation facility. The provider management unit 112 may generate an identifier for the quarantine area in the aggregation or distribution facility and may require the facility confirm the placement of the product into the quarantine area. In the event the product is in transit when the deviation from the client rule is identified, the provider management unit 112 may send an electronic transmission to the entity transporting the product to take the product to a predetermined quarantine location. The provider management unit 112 may also notify the provider that a replacement of the product is required and may notify the customer that the product delivery may be delayed. In the event the provider cannot supply a replacement quantity, the provider management unit 112 may select an alternate provider to supply the product.

In another embodiment, the provider management unit 112 may identify exact locations in the aggregation facilities and distribution facilities where individual products or orders are stored prior to delivery. Consistent with this embodiment, the product tracking and location unit 118 may track where products are stored at different facilities to determine the locations having the capacity to store new orders. New orders for products are then scheduled for delivery at new facilities based on current capacity at each facility. In another embodiment, the provider management unit 112 may generate a report showing the history of a product from acceptance at a supplier to delivery to a customer. In another embodiment, upon confirmation of delivery to a customer, the provider management unit 112 may generate an invoice that is sent to the client for the product or products delivered. In another embodiment, the provider management unit 112 may generate a report identifying the supplier, distribution and aggregation facility used to deliver products to each client.

Figure 6:
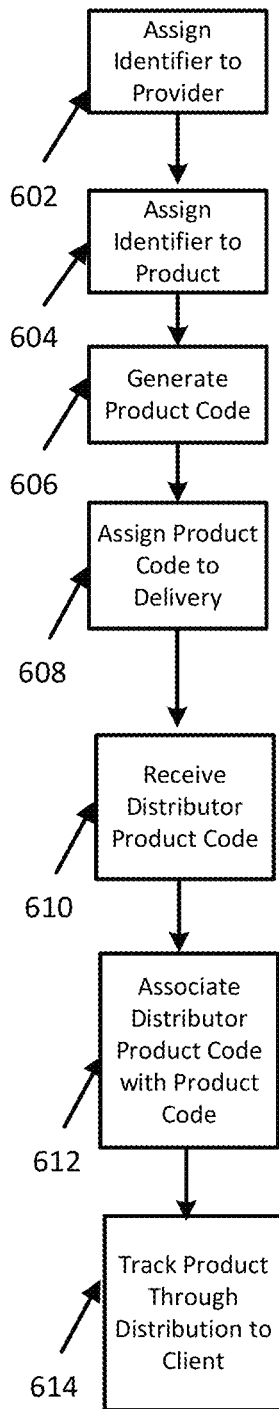
FIG. 6 depicts another illustrative example of the operation of the Agricultural Product Management System of FIG. 1.

FIG. 6 depicts another illustrative example of the operation of the APM 100. In step 602, a provider identifier is entered into the provider management unit 114 and is associated with the provider of a product. The provider identifier may be any known identifier including, but not limited to, a bar code or portion of a bar code, a quick response code, a radio frequency identifier or any other type of identifier. In step 604, a product identifier is entered into the provider management unit 112 and is associated with a product. The product identifier may be any known identifier including, but not limited to, a bar code or portion of a bar code, a quick response code, a radio frequency identifier or any other type of identifier.

In step 606, a product code is generated based on the provider identifier and product identifier. In one embodiment, the provider identifier and product identifier are combined to form a unique bar code number. The product identifier may be generated by the identifier generating unit 216 or 314. After the product identifier is generated, the product identifier may be adhered to the product or a container holding the product to identify the product.

In step 608, the product code is assigned to a delivery of the product from the provider associated with the product code. As an illustrative example, a farm may be assigned a unique identifier and apples may be assigned a separate identifier which are both used to generate a unique product code indicating the apples associated with the product code are from the farmer.

In step 610, the product management unit 114 receives a product code from a distributor of the product. The product code from the distributor may be different than the product code assigned by the product management unit 114. The distributor product code is used by the distributor to identify the product from receipt of the product until the delivery to the customer. In one embodiment, the product code may identify the type and category of the product. In step 612, the product management unit 114 associates the product code with the distributor product code. In one embodiment, the product delivered by the provider is marked with both the product code and the distributor product code. In step 614, the product management unit 114 tracks the location of the product delivery through the distribution and delivery process to a customer. Because the system tracks both provider and product codes independently of the distributor, the product management unit 114 can determine the amount of a product provided from a provider to a customer.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

What is claimed is:

1. A distributed computing system that practically applies networked computing technology and machine-readable indicia to support traceability of products from providers to clients, the system comprising:

a plurality of distributed computers for communication with a network, the distributed computers including first, second, third, and fourth computers;

wherein the first computer comprises a memory, and wherein the first computer is configured to store data in the memory, wherein the stored data comprises order data about an order for a product, the client having an associated local sourcing rule;

wherein the second computer is for operational use by a provider of the product with respect to the order;

wherein the third computer is for operational use by a distributor for the product with respect to the order; and wherein the fourth computer is for operational use by a client for the order;

wherein the second, third, and fourth computers are configured to generate additional data about the product for association in the memory with the order data via communications over the network, wherein the additional information comprises (1) a product identifier obtained from a machine-readable indicia for use with the product or a container for the product, wherein the product identifier encodes (i) provider information for the provider and (ii) product information for the product, (2) geographic information about the provider, and (3) dates of delivery and receipt for the product as the product moves through a supply chain from the provider to the client via the distributor, wherein the dates of delivery and receipt are linked to the product identifier;

wherein the local sourcing rule requires that the product be sourced from a provider within a defined geographic region; and wherein the first, second, third, and fourth computers cooperate with each other to (1) support tracing of the order from the provider to the client through the distributor based on the machine-readable indicia and the associations in the memory and (2) evaluate compliance for the order with the local sourcing rule based on the defined geographic region as compared to the geographic information about the provider of the product that is associated with the order data in the memory.

2. The system of claim 1, wherein the product identifier obtained from the machine-readable indicia also encodes the geographic information about the provider with respect to the product.

3. The system of claim 1, wherein the first computer is further configured to associate the product identifier with a product type in the memory.

4. The system of claim 1, wherein the product identifier comprises a product code combined with a provider code, wherein the product code serves as the product information, and wherein the provider code serves as the provider information;

wherein the third computer is further configured to communicate a distributor product code for the product to the first computer, wherein the distributor product code identifies the product, wherein the distributor product code is different than the product code from the product identifier, and wherein the first computer is further configured to associate the distributor product code with the product code from the product identifier.

5. The system of claim 1, further comprising:

a second machine-readable indicia for use at a distribution facility of the distributor, wherein the second machine-readable indicia encodes a distribution facility identifier, wherein the third computer includes a reader, wherein the reader is configured to read the second machine-readable indicia to gather the distribution facility identifier for communication to the first computer over the network for association with the order data in the memory.

6. The system of claim 1, wherein the distributed computers further include a fifth computer for operational use by an aggregation facility, and wherein the fifth computer is configured to generate aggregation data indicative of receipt of the product from the provider and delivery of the product to the distributor, wherein the fifth computer is further configured to communicate the aggregation data over the network to the first computer for association with the order data so that the order data in the memory supports tracing of the order from the provider to the client through the aggregation facility and the distributor.

7. The system of claim 1, wherein the additional data further comprises a transport identifier for an entity transporting the product from the provider.

8. The system of claim 1, wherein the additional data further comprises an aggregation facility identifier for an aggregation facility in the supply chain between the provider and the distributor.

9. The system of claim 8, wherein the additional data further comprises an identifier for a backhaul provider that transports the product from the distributor to the client.

10. The system of claim 1, wherein the client further has an associated provider demographic rule to be evaluated by the first computer with respect to the order data, wherein the provider demographic rule defines an ethnicity or economic background required for the provider.

11. The system of claim 1, wherein the client further has an associated organic sourcing rule to be evaluated by the first computer with respect to the order data, wherein the organic sourcing rule defines criteria for the product to qualify as organic.

12. The system of claim 1, wherein the client further has an associated sustainable or responsible sourcing rule to be evaluated by the first computer with respect to the order data, wherein the sustainable or responsible sourcing rule defines criteria for a meat product to qualify as sustainably-raised or responsibly-raised.

13. The system of claim 1, wherein the client further has an associated storage rule to be evaluated by the first computer with respect to the order data, wherein the storage rule defines criteria for storage of the product by the distributor, wherein the criteria is associated with a storage location within a distribution facility of the distributor, and wherein the third computer is further configured to communicate distributor storage location information over the network to the first computer for association with the order data, wherein the distributor storage location information identifies a location within the distribution facility where the product is stored prior to delivery to the client.

14. The system of claim 1, wherein the machine-readable indicia comprises a bar code.

15. The system of claim 1, wherein the machine-readable indicia comprises a QR code.

16. The system of claim 1, wherein the machine-readable indicia comprises an RFID tag.

17. The system of claim 1, wherein the memory comprises a relational database.

18. The system of claim 1, wherein the product comprises a food product.

19. The system of claim 1, wherein the product comprises an agricultural product, and wherein the provider is a farm.

20. The system of claim 1, wherein the product comprises produce, meat, poultry, and/or a dairy product.

21. The system of claim 1, wherein the client is a facility that provides the product to a consumer.

22. The system of claim 1, wherein the client is a health care facility, hospital, institution, school, university, government agency, nursing home, or extended care facility.

23. The system of claim 1, wherein the geographic information about the provider comprises a geographic location for the provider.

24. The system of claim 1, wherein the geographic location comprises an address.

* * * * *